UNITED STATES PATENT OFFICE.

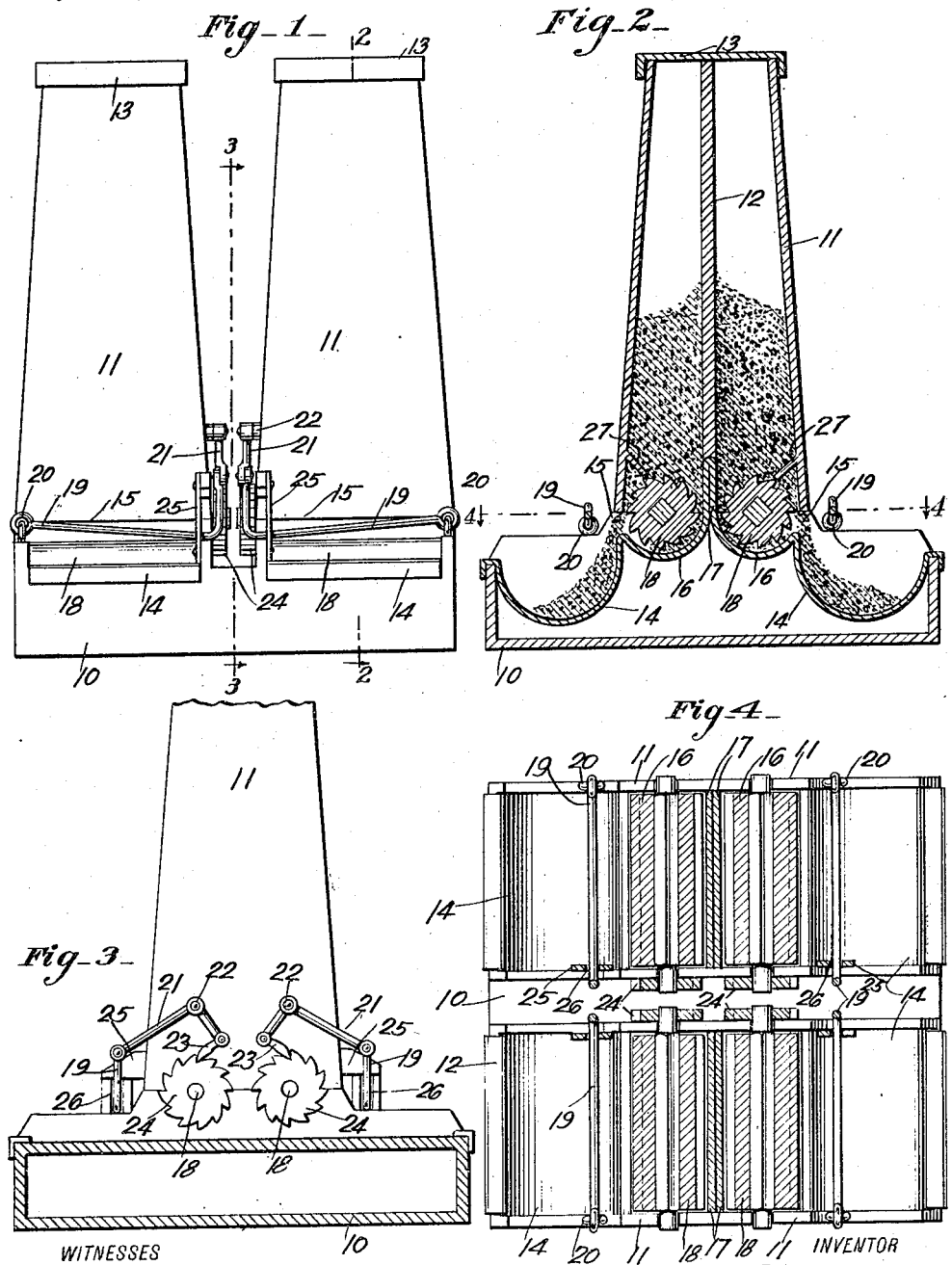

FRANK HOWARD PAGE, OF WAVERLY, IOWA.

HOG-FEEDER.

1,285,348.　　　　Specification of Letters Patent.　　Patented Nov. 19, 1918.

Application filed April 13, 1918.　Serial No. 228,450.

*To all whom it may concern:*

Be it known that I, FRANK H. PAGE, a citizen of the United States, and a resident of Waverly, in the county of Bremer and State of Iowa, have invented a new and Improved Hog-Feeder, of which the following is a full, clear, and exact description.

My invention relates to hog feeders and more particularly relates to a feeder in which feed devices are arranged in connection with a hopper or the like and adapted to be actuated by the animal for feeding a limited quantity at each operation.

An important object of the invention is to provide for the feed devices, actuating means so formed and arranged as to bring about the operation thereof by the snout of the animal approaching the feed outlet to which the animal is naturally attracted.

A further important object of the invention is to provide means arranged to discharge the feed from the hopper directly to the trough to thereby prevent clogging or packing of the feed between the feed means and the trough.

An important object furthermore is to so construct the hog feeder that it will be particularly effective with ground feed which, as is well known, involves greater difficulties in properly regulating the feed than are involved in the feeding of unground feed material.

More specific objects of the invention are to provide operating means for the feed devices that will be positive and unfailing in action; to provide actuating means for the feed devices at the exterior of the hopper so as to be accessible and to prevent the possibility of the feed devices becoming clogged; and to provide feed devices improved in various particulars with a view to promote simplicity and cheapness of construction as well as durability.

Reference is to be had to the accompanying drawings forming a part of this specification, it being understood that the drawings are merely illustrative of one example of the invention.

Figure 1 is a side elevation of a hog feeder embodying my invention;

Fig. 2 is a vertical section on the line 2—2, Fig. 1;

Fig. 3 is a vertical section on the line 3—3 Fig. 1;

Fig. 4 is a horizontal section on the line 4—4, Fig. 2.

In carrying out my invention in practice, a suitable base structure 10 is provided on which is a hopper or hoppers 11, which preferably are smaller toward the top, whereby to prevent packing of the feed material. The hopper in the illustrated form of the invention is provided with a vertical partition 12 at the center dividing the hopper into two vertical compartments, and with a suitable cover 13. It will be understood that any number of hoppers or compartments may be provided and a trough to receive the material from each compartment. Four troughs 14 are shown in the present example and formed advantageously of pressed metal. Each compartment of the hopper has in the front wall thereof at the bottom a narrow elongated outlet 15 and the bottom 16 of the hopper is concave, the back wall 17 of said bottom preferably being carried upwardly so that the backs 17 of two adjacent hoppers are juxtaposed to form a rest for the partition 12. In practice I produce the two troughs 14 at opposite sides and the adjacent concave bottoms 16 with their walls 17 in one piece. Moreover, it is to be noted from Fig. 2 that the rear upper edge of the trough 14 and the front edge of the concave bottom 16 are directly adjacent and merge one into the other, the adjacent edges defining the bottom of the outlet opening 15.

In each hopper compartment a feed roller 18 is disposed adjacent to the concave bottom 16 and the top side of the roller turns forwardly, whereby the roller will function upon each movement imparted thereto for discharging a given quantity of the feed depending on the depth of the grooves in the roller, it being observed also that the feed is discharged from the feed roller through the outlet opening 15 directly to the trough 14, so that there is no possibility of the feed becoming packed or clogged between the feed roller and the trough.

I provide an operating means for each roller 17 so formed and so positioned relatively to the opening 15 as to insure its operation by the snout of the animal approaching the outlet 15 in the effort to reach the feed within the hopper. The operating means include a rooter bar or rod 19 pivoted at one end in any suitable manner as by coengaging eyes shown at 20, an eye being formed on the rod 14 and there being a relatively fixed eye secured to the end wall of the hopper at the top. The position of the bar 19 is such that it will extend longitudinally of the trough at the rear side thereof directly in front of and adjacent to the outlet opening 15. For the hog's snout to approach close to the opening 15, the rod 19 must necessarily be lifted. At the opposite end of the rod 19 from the pivot, an operative connection is established between said rod and the adjacent roller 18. In the preferred form of the invention a bellcrank lever 21 has a long arm pivoted to the adjacent end of the bar 19, said lever being pivoted as at 22 on the hopper at the outside, the shorter arm of the bellcrank having pivoted thereto a pawl 23 adapted to engage in the teeth of a ratchet wheel 24 fast on the journal of the feed roller. Thus, with each vibration of the rod 19, the roller will be turned through an angle to feed a given quantity of food, the extent of the movement depending on the relative proportions of the bar 19 and the arms of the bellcrank 21. It is to be observed that the ratchet wheels 24 and bellcranks 21 being on the outside of the hopper will be readily accessible for adjustment or repair and that they cannot become clogged as is the case with operating means within the hopper. To brace and guide the bar 19 in its vibratory movements, I extend the same through a vertical slot 26 in the end wall 25 of the trough adjacent to the ratchet wheel.

I provide guards 27 on the front wall of the hopper at the inside, adjacent to the feed roller 15, to prevent escape of the material between said front wall of the hopper and the roller, except as the material is positively fed by the operation of said roller.

With the above described construction, the hogs in the effort to reach the feed within a hopper will vertically vibrate a bar 19, thereby rocking the lever 21 pertaining to said bar and through the pawl 23 the roller engaged thereby will be turned in a direction that the upper side moves forwardly carrying the material in the grooves of the roller beneath and forward of the guard 27, thereby causing the feed to be delivered to the trough.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A hog feeder including a container having an elongated outlet opening near the bottom, a trough at the front of the container below the outlet opening, a feed roller within the container adjacent to said opening, and operating means for said feed means, said operating means including a vertically vibratable bar disposed approximately horizontally at the back of the trough longitudinally of the outlet opening and directly in front of and adjacent to said outlet opening, together with means pivotally securing one end of the bar, adjacent to one end of the trough and outside of the hopper, and means connected with said bar at the opposite end and adapted to turn the feed roller.

2. A hog feeder including a hopper having an elongated opening near the bottom thereof, a trough in front of the hopper below said opening, a feed roller mounted to turn in the hopper at said opening, one of the journals of the roller extending to the exterior of the hopper, and actuating means for the feed means, said actuating means including a vertically vibratable bar extending longitudinally of the hopper at the back thereof in front of and directly adjacent to the outlet opening, said rod being loosely pivoted at one end on the trough, a bellcrank lever mounted on the hopper at the opposite side from the pivot of said bar, one arm of said lever being pivotally connected with the bar, a pawl on the other arm of said bellcrank lever, and a ratchet wheel on the projecting journal of the feed roller and engageable by said pawl.

FRANK HOWARD PAGE.

Copies of this patent may be obtained for five cents each, by addressing the "Commissioner of Patents, Washington, D. C."